Patented June 16, 1953

2,642,443

UNITED STATES PATENT OFFICE 2,642,443

QUATERNARY COMPOUNDS DERIVED FROM CHLOROMETHYLATED ARYLAMINOBENZANTHRONES

David I. Randall, Easton, Pa., and Edgar E. Renfrew, Phillipsburg, N. J., assignors to General Aniline & Film Corporation, New York, N. Y., a corporation of Delaware No Drawing. Application December 13, 1950, Serial No. 200,689

7 Claims. (Cl. 260—364)

This invention relates to novel water-soluble compounds of the arylaminobenzanthrone series, which are valuable as dyestuffs, especially for printing cotton and similar cellulosic materials, and for coloring wood pulp; and to a process for preparing the same.

The compounds of this invention are quaternary nitrogen base salts and isothiouronium salts, obtained by reacting a tertiary nitrogen base or a thiourea with a chloromethyl-substituted arylaminobenzanthrone compound in which the chloromethyl groups occupy nuclear positions of the arylamino radicals, and may occupy nuclear positions of the benzanthrone nucleus, the parent chloromethyl-substituted compounds being of the type described in our copending application Serial No. 200,688 filed of even date herewith.

Preparation of the compounds of this invention is conveniently effected by heating the chloromethyl-substituted arylaminobenzanthrone compound of the aforesaid type with at least an equivalent amount of a thiourea compound or a tertiary nitrogen base at elevated temperatures, e. g., about 100° C., and separating the acetone-insoluble residue from the reaction mixture. If both reagents are solid at the reaction temperature, water can be added as a reaction medium to facilitate the reaction. The reaction results in the replacement of the chlorine in the nuclear chloromethyl radicals of the parent compounds by a quaternary nitrogen base salt radical or an isothiouronium salt radical, whereby the products are rendered soluble in water.

The compounds of this invention are benzanthrone mono- or poly-aminoaryl mono- or poly-methyl quaternary nitrogen bases or -isothiouronium salts. The aryl radicals of the aminoaryl groups can be monocyclic radicals of the benzene series, or polycyclic radicals, e. g., of the naphthalene, biphenyl, anthracene, phenanthrene or diphenyl methane series, but are preferably monocyclic. The remaining nuclear positions of said aryl radicals can be unsubstituted or can contain such substituents as lower alkyl (e. g., methyl, ethyl) groups, or halogen (e. g., chlorine, bromine).

The tertiary nitrogen bases forming the quaternary nitrogen base salts of this invention can be, for example, pyridine, the picolines, quinoline, isoquinoline, trimethylamine, triethylamine, diethylaminoethyl alcohol, or benzyl diethylamine. Suitable thioureas for formation of the isothiouronium salts of the invention are, for example, thiourea, 1-methyl-, 1-phenyl-, 1-allyl-, 1,3-dimethyl-, 1,3-ethylene-, 1,1,3-trimethyl-, and 1,1,3,3,-tetramethylthiourea. Quaternary nitrogen base salt radicals have the formula

wherein $N(R)_3$ represents the radical of a tertiary amine, R represents an alkyl, alkylene, or aryl radical, and X represents a salt-forming anion such as chlorine. The isothiouronium salt radical has the formula

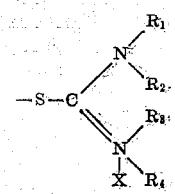

wherein $R_1$, $R_2$, $R_3$, and $R_4$ represent hydrogen or hydrocarbon groups such as alkyl, alkylene, and aryl, attached to nitrogen in the parent thiourea, and X is the same as above.

The following schematic equations represent the reactions involved:

(1) 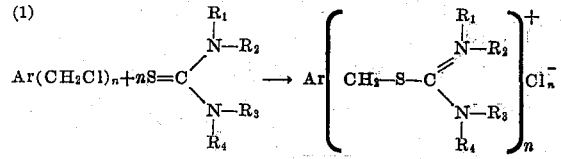

(2)  $Ar(CH_2Cl)_n + nN(R)_3 \longrightarrow Ar[CH_2-N(R)_3]_n^+ Cl_n^-$ wherein Ar is the radical of an arylaminobenzanthrone compound, n is a whole number equal to the number of free entering positions on the Ar radical, generally from 1 to 4, and the R's have the same values as above.

The compounds of this invention can be applied in printing pastes to cotton fiber, whereby they yield bright, full shades of good fastness to washing and chlorine. They are highly substantive to paper pulp and when applied for coloration of this material, they possess excellent fastness to bleeding.

Preparation of representative compounds of this invention is illustrated in the following examples, wherein parts are by weight unless otherwise expressed:

Example 1

Ten parts of the tris-chloromethylated derivative of Bz-1-p-toluidinobenzanthrone, which is described in Example 2 of our application, Serial No. 200,688 and 10.0 parts 1,1,3-trimethylthiourea were warmed at steam temperature of about 100° C. with 50.0 parts water for 15 minutes.

The smooth paste was poured into 200.0 parts stirred acetone (to remove excess quaternizing agent) and the acetone-insoluble portion was isolated by decantation and the acetone evaporated off. The resulting material when printed on cotton gave intense yellow shades of good properties, especially to washing. Paper was strongly colored, especially in the pulp, the resistance to bleeding was excellent. The product has the structural formula:

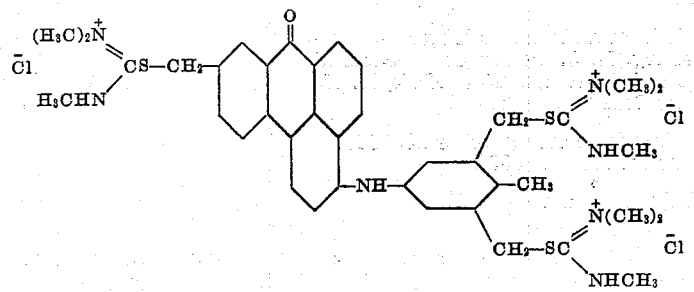

1,3-dimethylthiourea and ethylenethiourea can be used in place of the trimethylthiourea without changing the properties of the quaternary to any significant degree.

Example 2

Ten parts of the polychloromethylated derivaive of Bz-1,6-di-p-toluidinobenzanthrone, described in Example 4 of application Serial No. 200,688, and 10.0 parts 1,1,3-trimethylthiourea were warmed with 100.0 parts water at steam temperatures (about 100° C.) until a smooth paste resulted. This material was stirred with 400.0 parts acetate. The acetone was decanted and the residue air dried. The material yielded attractive yellow prints on cotton; the properties were similar to those of the product of Example 1, but somewhat redder in shade. Paper colored with the product showed good resistance to bleeding. The product has the following structural formula:

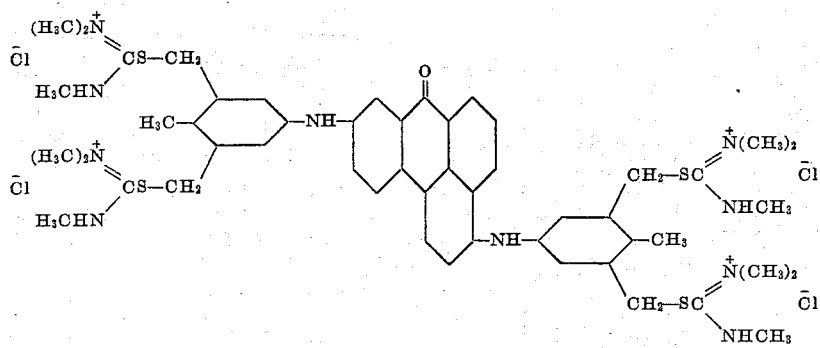

1,3-dimethylthiourea and ethylene thiourea can be used in place of trimethylthiourea. The properties are similar.

In carrying out the reaction of the chloromethyl-substituted arylaminobenzanthrone compounds with a tertiary nitrogen base or a thiourea, as illustrated in the foregoing examples, water can be used as a reaction medium. In general, at least one of the reagents should be present in a liquid phase. When one of the reagents is a liquid such as pyridine or triethylamine, an excess of the nitrogen base can be used as the reaction medium. When an excess of the tertiary nitrogen base or of the thiourea is used, the unreacted portion thereof can be removed from the reaction mixture by appropriate treatment, such as evaporation in the case of volatile compounds such as pyridine, or extraction with an organic solvent for the reagent present in excess, in which the reaction product is insoluble. In most cases, acetone can be used for this purpose. When a stoichiometrical amount of the nitrogen base or thiourea compound is employed, extraction with acetone or similar solvents is generally unnecessary to obtain the product in satisfactorily pure form.

A reaction temperature of about 100° C., illustrated in the foregoing examples, is chosen as convenient. However, temperatures from 70 to 150° C. can generally be employed.

Instead of the chloromethyl-substituted arylamino-benzanthrones serving as intermediates in the foregoing examples, other nuclear chloromethyl-substituted arylaminobenzanthrone compounds can be used, wherein the chloromethyl-substituted anilino and p-toluidino radicals of the starting materials of the examples are replaced by other chloromethyl-substituted arylamino groups, e. g., by chloromethyl-substituted -m-xylidino, -p-chloroanilino, -α- or -β-naphthylamino, -p-benzylanilino, or -p-phenylanilino radicals. The benzanthrone radicals of such compounds may also have at least chlormethyl group on the nucleus capable of quaternization. Similarly, instead of pyridine as the quaternizing or salt-forming reactant, other tertiary nitrogen bases such as the pilcolines, quinoline, isoquinoline, trimethylamine, triethylamine, benzyl diethylamine and triethylaminoethyl alcohol can be used. Instead of the thioureas of the examples, there can be used equivalent amounts of 1-methyl, 1-allyl-, 1-phenyl-, or 1,1,3,3-tetramethyl-thiourea.

The products obtained according to the examples or variations hereinbefore mentioned, are in each case water-soluble, and yield bright colorations on cellulosic materials such as cotton and wood pulp, said colorations having good fastness properties, especially to light, washing or bleeding.

Variations and modifications which will be obvious to those skilled in the art can be made in the foregoing processes and compositions, without departing from the scope or spirit of the invention.

We claim:
1. A member of the group consisting of benzanthrone arylaminomethyl-quaternary nitrogen base and -isothiouronium salts.
2. A benzanthrone aminomonocyclic arylmethylisothiouronium salt.
3. The isothiouronium salt of trischloromethylated Bz-1-p-toluidinobenzanthrone having the formula:

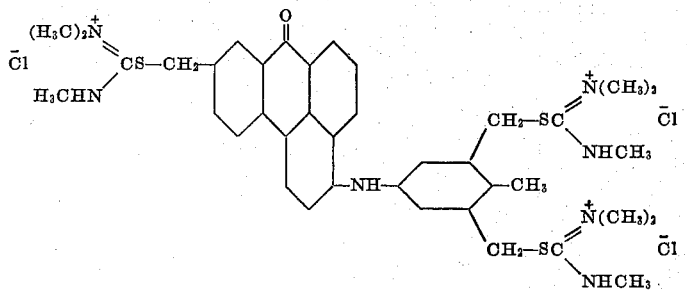

4. The isothiouronium salt of polychloromethylated Bz - 1-6-di-p-toluidinobenzanthrone having the formula

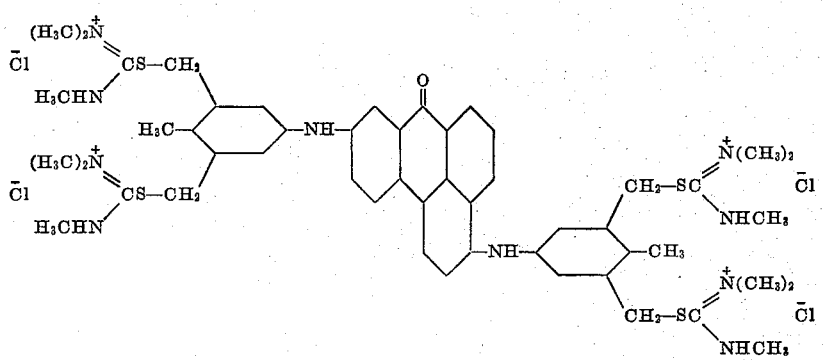

5. The process of producing a soluble salt of a nuclear chloromethyl-substituted arylaminobenzanthrone which comprises reacting a nuclear chloromethyl arylaminobenzanthrone with a member of the group consisting of a tertiary nitrogen base and a thiourea in a liquid medium at a temperature of from 70° C. to 150° C.

6. The process of producing a soluble salt of nuclear tris-chloromethyl - Bz-1-p-toluidinobenzanthrone which comprises reacting trischloromethyl - Bz - 1-p-toluidinobenzanthrone with 1,1,3-trimethylthiourea in aqueous solution at approximately 100° C.

7. The process of producing a soluble salt of nuclear tetra-chloromethyl - Bz - 1,6-di-p-toluidinobenzanthrone which comprises reacting chloromethyl - Bz - 1,6 - di-p-toluidinobenzanthrone with 1,1,3-trimethylthiourea in aqueous solution at approximately 100° C.

DAVID I. RANDALL.
EDGAR E. RENFREW.

References Cited in the file of this patent

FOREIGN PATENTS

| Number | Country | Date |
|---|---|---|
| 508,029 | Great Britain | June 23, 1939 |
| 613,982 | Great Britain | Dec. 7, 1948 |
| 613,983 | Great Britain | Dec. 7, 1948 |